(Model.)
W. B. ELTONHEAD.
CONDUIT FOR UNDERGROUND LINES.
No. 267,409. Patented Nov. 14, 1882.
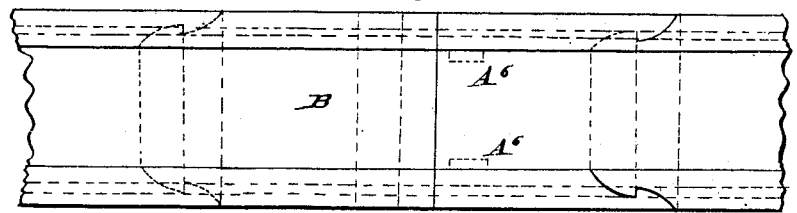
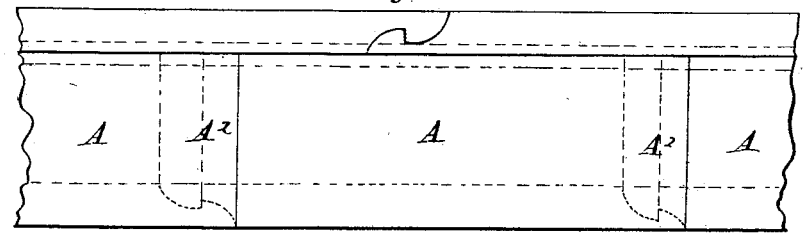
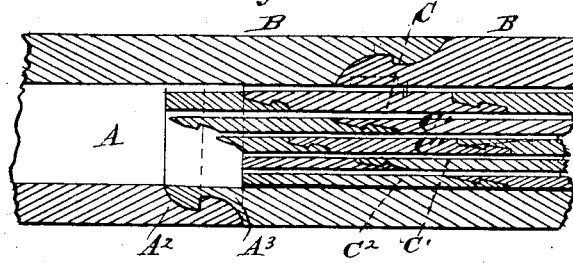 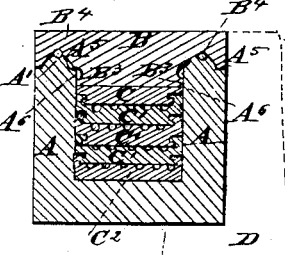
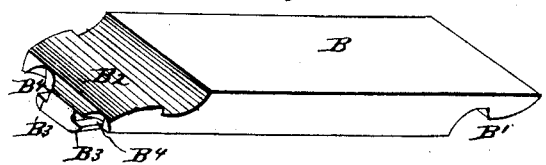 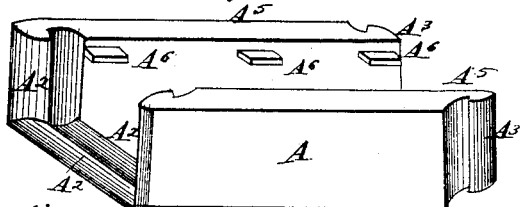
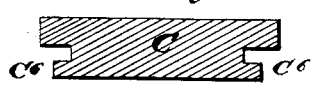 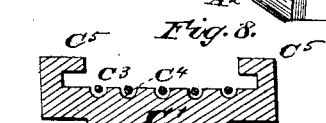 
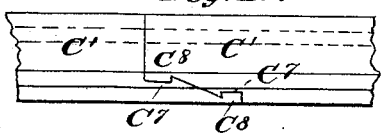
WITNESSES
P. H. Dietrich
Geo Binkenburg
INVENTOR
Wm B Eltonhead
per S. Lloyd Wiegand
ATTORNEY

UNITED STATES PATENT OFFICE.

WILLIAM B. ELTONHEAD, OF PHILADELPHIA, PENNSYLVANIA, ASSIGNOR TO ED. Y. ELTONHEAD, OF SAME PLACE.

CONDUIT FOR UNDERGROUND LINES.

SPECIFICATION forming part of Letters Patent No. 267,409, dated November 14, 1882.

Application filed December 29, 1881. (Model.)

*To all whom it may concern:*

Be it known that I, WILLIAM B. ELTONHEAD, a citizen of the United States, residing in the city and county of Philadelphia, and State of Pennsylvania, have invented certain new and useful Improvements in Conduits for Underground Lines; and I do hereby declare the following to be a full, clear, and exact description of the invention, such as will enable others skilled in the art to which it pertains to make and use the same.

This invention relates to that class of insulators adapted to be placed on or in the ground, and has for its object the economical and safe insulation of a number of wires, and their protection from water and accidental or intentional injury.

The nature of my invention consists in a trough formed in interlocking sections, provided with a lid, also formed in interlocking sections, and provided with projections adapted to engage in corresponding projections formed on or in the trough. The lid and trough are grooved and tongued in such manner as to exclude and turn off water, and to receive a packing, seal, or cement, to more effectually exclude water, combined with a series of longitudinally-grooved tiles, each of which has hooked lugs or projections, which engage in and hold on corresponding projections in the adjacent tiles. Said tiles, as assembled and combined with each other and with their inclosing trough and cover, contain a series of parallel channels adapted to insulate and protect electrical wires or conductors, and may be buried in the ground or used as a curbing for sidewalks and roadways, or may be placed within or back of the curbing of highways. The troughs, covers, and grooved plates are made of furnace-slag, glass, artificial stone, or any non-conducting material, or of conducting material coated with non-conducting material.

I will now proceed to describe the mode of making and using this invention, referring in so doing to the drawings annexed, and letters of reference marked thereon, in which—

Figure 1 is a plan; Fig. 2, a side elevation; Fig. 3, a longitudinal vertical section; Fig. 4, a transverse section; Fig. 5, a detached view of the cover; Fig. 6, a detached view of the trough; and Figs. 7, 8, and 9, respectively, views in section of the top, middle, and bottom insulating grooved tiles, drawn on an enlarged scale; and Fig. 10 shows the manner of interlocking the ends of the tiles or grooved insulating-plates with each other.

The same letters of reference apply to the same parts in the several figures.

A is a trough, formed of furnace-slag, glass, artificial stone, cement, or other non-conducting material, or of conducting material coated or covered with a non-conducting substance.

$A'$ $A'$ are tongues or ridges formed on the upper edges of the trough A, having a groove, $A^5$, in the upper edge, adapted to receive a packing or cement.

$A^2$ are locking-grooves, formed across the bottom and in the sides of one end of each section of the trough A, adapted to receive corresponding locking-projections, $A^3$, upon the bottom and sides of the contiguous end of the next section of trough A.

$A^6$ are lugs or projections formed on the inner side of the trough A for the purpose of holding the lid B down in a manner hereinafter explained.

B is a cover formed of similar material to the trough A, and provided with grooves $B^4$ on its under side, adapted to fit on the tongues or ridges $A^5$ of the trough A.

$B^2$ are transverse projections on each section of the cover B, adapted to fit into a transverse groove, $B'$, on the end of the next section of the cover B, and thus lock the several sections of the cover B together.

$B^3$ are hooks or lugs formed on the under side of each section of the cover B, and, fitting under the lugs $A^6$ on the trough A, hold the cover B down on the trough A. The lugs $B^3$ may be disengaged from the lugs $A^6$ by raising the farther end of the cover-section B and moving the cover lengthwise the distance of the length of the lugs $A^6$.

Inside of the trough A, I place a series of grooved tiles, $C'$ and $C^2$, into the parallel grooves $C^3$ of which the electrical conducting-wires $C^4$ are placed. The tile $C^2$ is placed at the bottom of the trough A, and has flanges at its edges (marked $C^5$) adapted to engage in the corresponding flanges, $C^6$, formed on the edges of the lower side of the grooved tiles C', and thus hold the tile C' to the tile C². Flanges C⁵, formed on the edges of the upper side of the tile C', serve to hold another tile similar to it by the flanges C⁶, and, lastly, the trough is filled by a covering-tile, C, having flanges C⁶ engaging in the flanges C⁵ of the tile C' below it. The several tiles C, C', and C², are provided with transverse grooves C⁷ and projections C⁸, by the interlocking of which they are securely held in position, so that the grooves in them combine to form continuous insulating-channels, and by sliding the several layers of tiles over each other, so as to "break" or "cover" joints, both lateral, vertical, or torsional displacement becomes impossible. When the series of tiles is assembled liquid or plastic cements may be used to seal them and exclude water.

The troughs A may be used as curb for roadways, or it may be placed back of a curb, as indicated by the dotted outline marked D, representing a curb in Fig. 4, or the entire trough and cover may be buried.

Having described my invention and the mode of making and using the same, what I claim is—

1. The grooved tile C', provided with locking-flanges C⁵ and C⁶, adapted to engage with similar flanges on similar tiles placed either above or below it, and to form when assembled with such similar tiles continuous conduits for electrical conductors, substantially as shown and described.

2. The combination of the trough A and cover B, formed in interlocking sections, and provided with the lugs B³ and A⁶, whereby the two may be securely locked together, with the interlocking grooved tiles C', provided with flanges C⁵ and C⁶, substantially as and for the purpose set forth.

3. The combination of the grooved tile C, having the locking-flanges C⁵, the grooved tile C', having the locking-flanges C⁵ and C⁶, and the grooved tile C², having the flanges C⁶, forming, when assembled, continuous insulating-conduits for electrical conductors, substantially as and for the purpose set forth.

4. The combination of an inclosing-trough, A, and cover B, respectively provided with lugs A⁶ and B³, whereby the same may be securely locked together with the grooved tiles C, having the locking-flanges C⁵, the grooved tile C', having the locking-flanges C⁵ and C⁶, and the grooved tile C², having the grooved locking-flanges C⁶, forming, when assembled, a series of continuous insulating-conduits for electrical conductors protected from moisture and external violence, substantially as and for the purpose set forth.

In testimony whereof I have signed this specification in the presence of two subscribing witnesses.

WM. B. ELTONHEAD.

Witnesses:
F. O. McCLEARY,
A. W. BRIGHT.